United States Patent
Wild et al.

(10) Patent No.: US 8,217,760 B2
(45) Date of Patent: Jul. 10, 2012

(54) APPLIQUE NODES FOR PERFORMANCE AND FUNCTIONALITY ENHANCEMENT IN RADIO FREQUENCY IDENTIFICATION SYSTEMS

(75) Inventors: Ben J. Wild, Sunnyvale, CA (US); Upamanyu Madhow, Santa Barbara, CA (US); Kannan Ramchandran, El Cerrito, CA (US); Robert Barton, San Jose, CA (US); Artem Tkachenko, Fremont, CA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 588 days.

(21) Appl. No.: 12/407,383

(22) Filed: Mar. 19, 2009

(65) Prior Publication Data

US 2010/0013601 A1 Jan. 21, 2010

Related U.S. Application Data

(60) Provisional application No. 61/070,024, filed on Mar. 20, 2008.

(51) Int. Cl.
*H04Q 5/22* (2006.01)
(52) U.S. Cl. ............. 340/10.1; 340/686.6; 340/572.2; 340/572.4; 340/10.5; 340/572.1
(58) Field of Classification Search .......... 340/10.1, 340/686.6, 572.2, 572.4, 10.5, 572.1; 455/562.1, 455/561; 343/895, 846, 700 MS
See application file for complete search history.

(56) References Cited

U.S. PATENT DOCUMENTS

| | | | |
|---|---|---|---|
| 4,224,472 A | 9/1980 | Zarount | |
| 4,532,635 A | 7/1985 | Mangulis | |
| 4,728,955 A | 3/1988 | Hane | |
| 4,901,307 A | 2/1990 | Gilhousen et al. | |
| 4,905,221 A | 2/1990 | Ichiyoshi | |
| 5,073,900 A | 12/1991 | Mallinckrodt | |
| 5,084,900 A | 1/1992 | Taylor | |
| 5,097,350 A | 3/1992 | Baran | |
| 5,138,631 A | 8/1992 | Taylor | |
| 5,220,320 A | 6/1993 | Assal et al. | |

(Continued)

FOREIGN PATENT DOCUMENTS

JP 2006-284510 10/2006

OTHER PUBLICATIONS

International Search Report for corresponding PCT Application No. PCT/US2009/037812, dated Jul. 15, 2009.

(Continued)

*Primary Examiner* — Hoi Lau
(74) *Attorney, Agent, or Firm* — Caesar, Rivise, Bernstein, Cohen & Pokotilow, Ltd.

(57) ABSTRACT

In an RFID system with existing reader and tags communicating with each other, appliqués derive information by listening to this communication to yield significant performance benefits, while not affecting the communication between the existing nodes. For example, an appliqué capable of receiving beamforming can estimate the angle of arrival of the signal emitted by a tag, thereby providing information that can be used to localize the tag. An appliqué may be connected to an existing reader by means of an existing port, such as to an antenna port or to an Ethernet port. The information from appliqués can be integrated with that obtained from existing nodes at either the appliqués, or further up the hierarchy in middleware.

6 Claims, 7 Drawing Sheets

U.S. PATENT DOCUMENTS

| | | | |
|---|---|---|---|
| 5,410,568 A | 4/1995 | Schilling | |
| 5,414,728 A | 5/1995 | Zehavi | |
| 5,428,820 A | 6/1995 | Okada et al. | |
| 5,490,087 A | 2/1996 | Redden et al. | |
| 5,511,068 A | 4/1996 | Sato | |
| 5,566,168 A | 10/1996 | Dent | |
| 5,588,005 A | 12/1996 | Ali et al. | |
| 5,619,209 A | 4/1997 | Horstein et al. | |
| 6,037,898 A | 3/2000 | Parish et al. | |
| 6,075,972 A | 6/2000 | Laubach et al. | |
| 6,252,542 B1 | 6/2001 | Sikina et al. | |
| 6,580,978 B1 | 6/2003 | McTamaney | |
| 6,600,418 B2 | 7/2003 | Franis et al. | |
| 6,600,420 B2 | 7/2003 | Goff et al. | |
| 7,345,625 B1 | 3/2008 | Urkowitz | |
| 7,362,266 B2 | 4/2008 | Collinson | |
| 7,501,943 B1 | 3/2009 | Ferrante | |
| 7,860,535 B2 * | 12/2010 | Kuramoto et al. | 455/562.1 |
| 2001/0017723 A1 | 8/2001 | Chang et al. | |
| 2001/0052875 A1 * | 12/2001 | Kohno et al. | 342/417 |
| 2002/0042290 A1 | 4/2002 | Williams et al. | |
| 2002/0070862 A1 | 6/2002 | Francis et al. | |
| 2002/0130775 A1 | 9/2002 | Engellenner | |
| 2003/0199255 A1 * | 10/2003 | Arisawa | 455/108 |
| 2003/0206107 A1 | 11/2003 | Goff et al. | |
| 2004/0061644 A1 | 4/2004 | Lier et al. | |
| 2004/0178955 A1 | 9/2004 | Menache et al. | |
| 2005/0110641 A1 * | 5/2005 | Mendolia et al. | 340/572.7 |
| 2005/0128159 A1 | 6/2005 | Wang et al. | |
| 2005/0130606 A1 | 6/2005 | Wang et al. | |
| 2005/0141459 A1 | 6/2005 | Li et al. | |
| 2005/0192727 A1 | 9/2005 | Shostak et al. | |
| 2005/0206523 A1 | 9/2005 | Engellenner | |
| 2005/0207617 A1 | 9/2005 | Sarnoff | |
| 2005/0208897 A1 * | 9/2005 | Lyons et al. | 455/67.11 |
| 2005/0280538 A1 * | 12/2005 | Kawai et al. | 340/572.1 |
| 2006/0052054 A1 * | 3/2006 | Uehara | 455/41.1 |
| 2006/0082444 A1 * | 4/2006 | Sweeney et al. | 340/10.3 |
| 2006/0119511 A1 | 6/2006 | Collinson | |
| 2006/0125691 A1 | 6/2006 | Menache et al. | |
| 2006/0135211 A1 | 6/2006 | Chae et al. | |
| 2006/0145815 A1 * | 7/2006 | Lanzieri et al. | 340/10.2 |
| 2006/0158333 A1 * | 7/2006 | Garber et al. | 340/572.2 |
| 2006/0192710 A1 | 8/2006 | Schieblich | |
| 2006/0291544 A1 | 12/2006 | Fischer et al. | |
| 2006/0293015 A1 * | 12/2006 | Mori et al. | 455/276.1 |
| 2007/0001809 A1 | 1/2007 | Kodukula et al. | |
| 2007/0001811 A1 * | 1/2007 | Kiyohara | 340/10.1 |
| 2007/0032266 A1 * | 2/2007 | Feher | 455/553.1 |
| 2007/0049200 A1 * | 3/2007 | Nagai | 455/63.1 |
| 2007/0126585 A1 * | 6/2007 | Okunev et al. | 340/572.7 |
| 2007/0149251 A1 | 6/2007 | Jeon | |
| 2007/0187266 A1 | 8/2007 | Porter et al. | |
| 2007/0205955 A1 | 9/2007 | Korisch et al. | |
| 2007/0222701 A1 * | 9/2007 | Yoon et al. | 343/895 |
| 2007/0224942 A1 * | 9/2007 | Kuramoto et al. | 455/67.11 |
| 2007/0225033 A1 * | 9/2007 | Yoon et al. | 455/552.1 |
| 2007/0249404 A1 | 10/2007 | Gao et al. | |
| 2007/0290849 A1 * | 12/2007 | Tuttle | 340/572.1 |
| 2008/0012710 A1 * | 1/2008 | Sadr | 340/572.1 |
| 2008/0025430 A1 * | 1/2008 | Sadowsky | 375/267 |
| 2008/0079546 A1 * | 4/2008 | Alicot et al. | 340/10.3 |
| 2008/0109970 A1 * | 5/2008 | Hutton | 14/71.5 |
| 2008/0111693 A1 | 5/2008 | Johnson et al. | |
| 2008/0147265 A1 | 6/2008 | Breed | |
| 2008/0177591 A1 | 7/2008 | Mattlin et al. | |
| 2008/0186180 A1 | 8/2008 | Butler et al. | |
| 2008/0211630 A1 | 9/2008 | Butler et al. | |
| 2008/0229525 A1 * | 9/2008 | Hutton | 14/71.5 |
| 2008/0231420 A1 * | 9/2008 | Koyama et al. | 340/10.1 |
| 2008/0252459 A1 | 10/2008 | Butler et al. | |
| 2008/0266098 A1 | 10/2008 | Aiouaz et al. | |
| 2008/0311931 A1 * | 12/2008 | Venkatachalam et al. | 455/456.6 |
| 2009/0045954 A1 | 2/2009 | Hall et al. | |
| 2009/0146792 A1 | 6/2009 | Sadr et al. | |
| 2009/0150264 A1 | 6/2009 | Hurtis et al. | |
| 2009/0160605 A1 | 6/2009 | Roemerman et al. | |
| 2009/0160611 A1 | 6/2009 | Calvarese et al. | |
| 2009/0212921 A1 * | 8/2009 | Wild et al. | 340/10.5 |

OTHER PUBLICATIONS

Flexible Smart Antenna Architecture for WLAN Application Success, Motia—Antenna Systems 2005, slides 1-27, Oct. 6, 2004.

\* cited by examiner

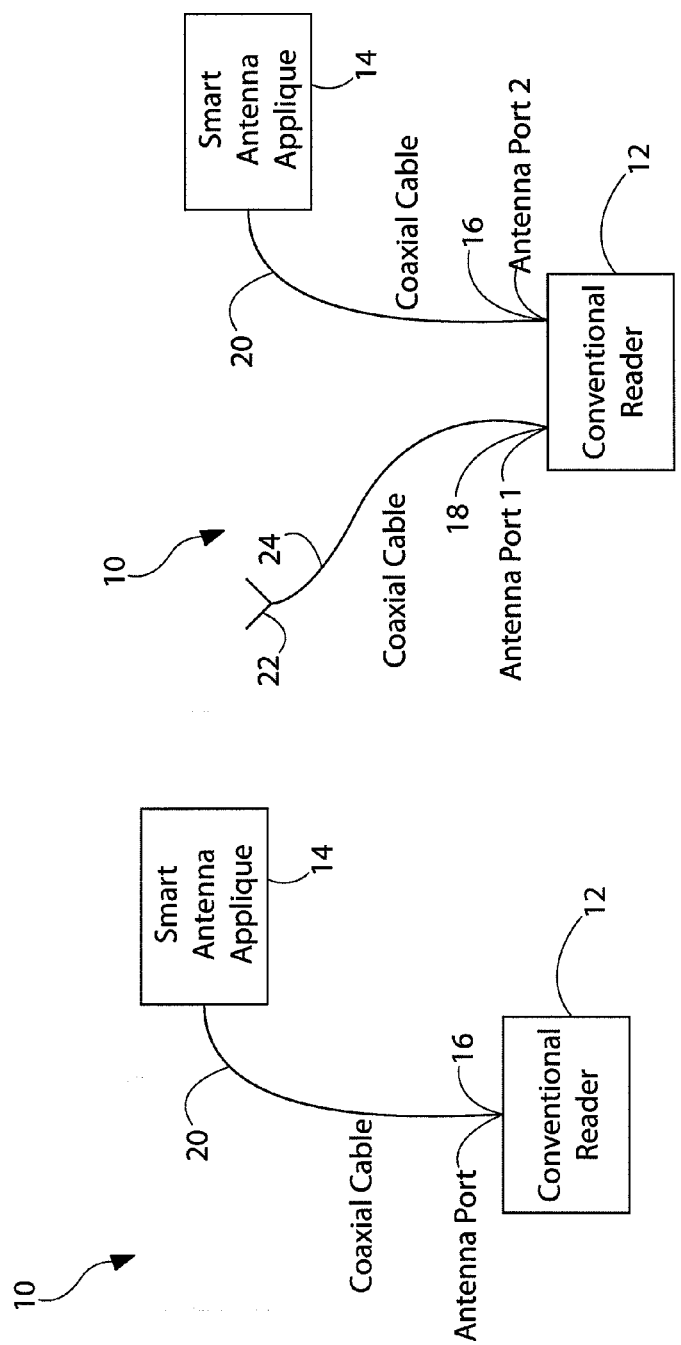

APPLIQUE NODES FOR PERFORMANCE AND FUNCTIONALITY ENHANCEMENT IN RADIO FREQUENCY IDENTIFICATION SYSTEMS

CROSS-REFERENCE TO RELATED APPLICATIONS

This utility application claims the benefit under 35 U.S.C. §119(e) of Provisional Application Ser. No. 61/070,024, filed on Mar. 20, 2008, entitled APPLIQUE NODES FOR PERFORMANCE AND FUNCTIONALITY ENHANCEMENT IN RADIO FREQUENCY IDENTIFICATION SYSTEMS and whose entire disclosure is incorporated by reference herein.

BACKGROUND OF THE INVENTION

1. Field of the Invention

This invention relates generally to radio frequency communication; and more particularly to enhancements in performance and functionality to Radio Frequency Identification (RFID) systems.

2. Description of Related Art

A key application of the disclosed methods is for identification, localization and tracking of tagged assets. An asset is any item whose location is of interest, and an asset tag is a tag associated with the asset, for example, by affixing the asset tag to the asset. Assets may be inanimate objects such as books, or persons, animals, and/or plants. A reader is any device that communicates with the tag.

In a conventional radio frequency identification (RFID) system, data encoded in a tag is communicated by the tag to a reader in response to a query from the reader. A tag may be batteryless (i.e., a passive tag), in which case a transmitted beam from the reader energizes the tag's circuitry, and the tag then communicates data encoded in the tag to the reader using modulated backscatter. Since the tag is typically affixed to an asset (e.g., an item being tracked by the RFID system), the data encoded in the tag may be used to uniquely identify the asset.

In the case of a semi-passive tag, a battery included with the tag powers the tag's circuitry. When the tag detects the transmitted beam from the reader, the tag communicates data encoded in the tag to the reader using modulated backscatter. In the case of an active tag, a battery included with the tag may power the communication to the reader without first detecting or being energized by the transmit beam. Semi-passive tags and active tags may also include data encoded in the tag that may uniquely identify the asset.

In conventional RFID systems, the ability of the reader to determine the location of a tag may be limited because the reader typically transmits a beam with a broad pattern. Conventional RFID systems may employ a reader including one or more antennas, where each antenna has a fixed beam pattern. These antennas are typically separated by a spacing that is large compared to the transmitted beam's wavelength, in order to provide diversity against multi-path fading and to increase the reliability of receiving the communication from tags with unknown orientations. In addition, conventional RFID systems may be limited when the communication range between a single fixed reader and a tag is too small to read all tags in an area of interest.

Active tags are equipped with batteries, and can communicate with readers in an arbitrary format. In particular, unlike passive and semi-passive tags, active tags can also initiate communication. In all cases, the communication between readers and tags is governed by a prespecified protocol, and the assumption in most systems is that all nodes in the system are actively communicating based on such a protocol. Examples of active tags are "WiFi" tags that are compatible with the IEEE 802.11 wireless local area network (WLAN) standards. The use of such tags allows potentially exploiting existing WLAN infrastructure for asset identification, localization and tracking.

All references cited herein are incorporated herein by reference in their entireties.

BRIEF SUMMARY OF THE INVENTION

In an RFID system with an existing reader and tags communicating with each other, an appliqué in communication with the reader derives information by listening to this communication to yield significant performance benefits, while not affecting the communication between the existing nodes. For example, an appliqué node capable of receiving beamforming can estimate the angle of arrival of the signal emitted by a tag, thereby providing information that can be used to localize the tag. An appliqué node may be connected to an existing reader by means of an existing port, such as to an antenna port or to an Ethernet port. Information gathered by the appliqué node can be accessed by the reader using a variety of mechanisms using connections to such ports. Alternatively, the information from the appliqué nodes can be communicated over a wireless or wireline network which operates in a band separate from that of RFID communication between existing nodes. The information from appliqué nodes can be integrated with that obtained from existing nodes at either the appliqué nodes, or further up the hierarchy in middleware.

In an exemplary embodiment of the invention, an appliqué node in communication with an antenna port of a RFID reader includes a smart antenna having a transmit antenna and a plurality of receive antennas. The smart antenna includes a plurality of matching demodulators, a plurality of matching a/d converters, and a digital signal processor. Each matching demodulator is attached to one of the receive antennas to demodulate a RF signal received by the attached receive antenna from an RFID tag. Each matching a/d converter is attached to one of the matching demodulators and converts the demodulated RF signals to digital sample signals. The digital signal processor calculates the angle of arrival of the RF signal and locates the position of the RFID tag based on the digital sample signals.

BRIEF DESCRIPTION OF SEVERAL VIEWS OF THE DRAWINGS

The invention will be described in conjunction with the following drawings in which like reference numerals designate like elements and wherein:

FIG. 1 is a smart antenna appliqué connected to reader's antenna port in accordance with a first exemplary embodiment;

FIG. 2 is a smart antenna appliqué connected to reader's antenna port in accordance with a second exemplary embodiment;

DETAILED DESCRIPTION OF THE INVENTION

This disclosure discusses appliqué nodes for enhancing the performance and capabilities of RFID systems. An appliqué node (hereinafter also referred to as an "appliqué") derives information about a tag's identity and location by listening to, and processing, signals associated with communication between readers and tags. Information from appliqués and readers in the system are preferably aggregated to obtain a global view of the identity and location of tagged assets. An appliqué may communicate the information it has gathered via wired or wireless links to other nodes in the network. Wireless links may use the same frequency band as that used for RFID communication between the readers and tags, or may use a different band. Appliqués may be deployed separately from existing nodes in the network, or connected to existing network nodes such as RFID readers.

Appliqués offer the ability to provide seamless upgrades of RFID systems. For example, an appliqué with a receive antenna array (henceforth also referred to as a "receive beamforming appliqué") can provide information regarding angles of arrival and range. For a modulated backscatter based RFID system, the use of a receive antenna array for asset tracking is described in U.S. patent application Ser. No. 12/072,423 entitled "Localizing tagged assets using modulated backscatter" with the same assignee, the disclosure of which is incorporated herein by reference in its entirety. These methods of using a receive antenna array for location estimation also apply directly to systems employing active tags, as is evident to one skilled in the art. Information from a receive beamforming appliqué can supplement information based on time of flight or received signal strength obtained by the existing RFID infrastructure.

The invention will be illustrated in more detail with reference to the following Examples, but it should be understood that the present invention is not deemed to be limited thereto.

Figure 3:
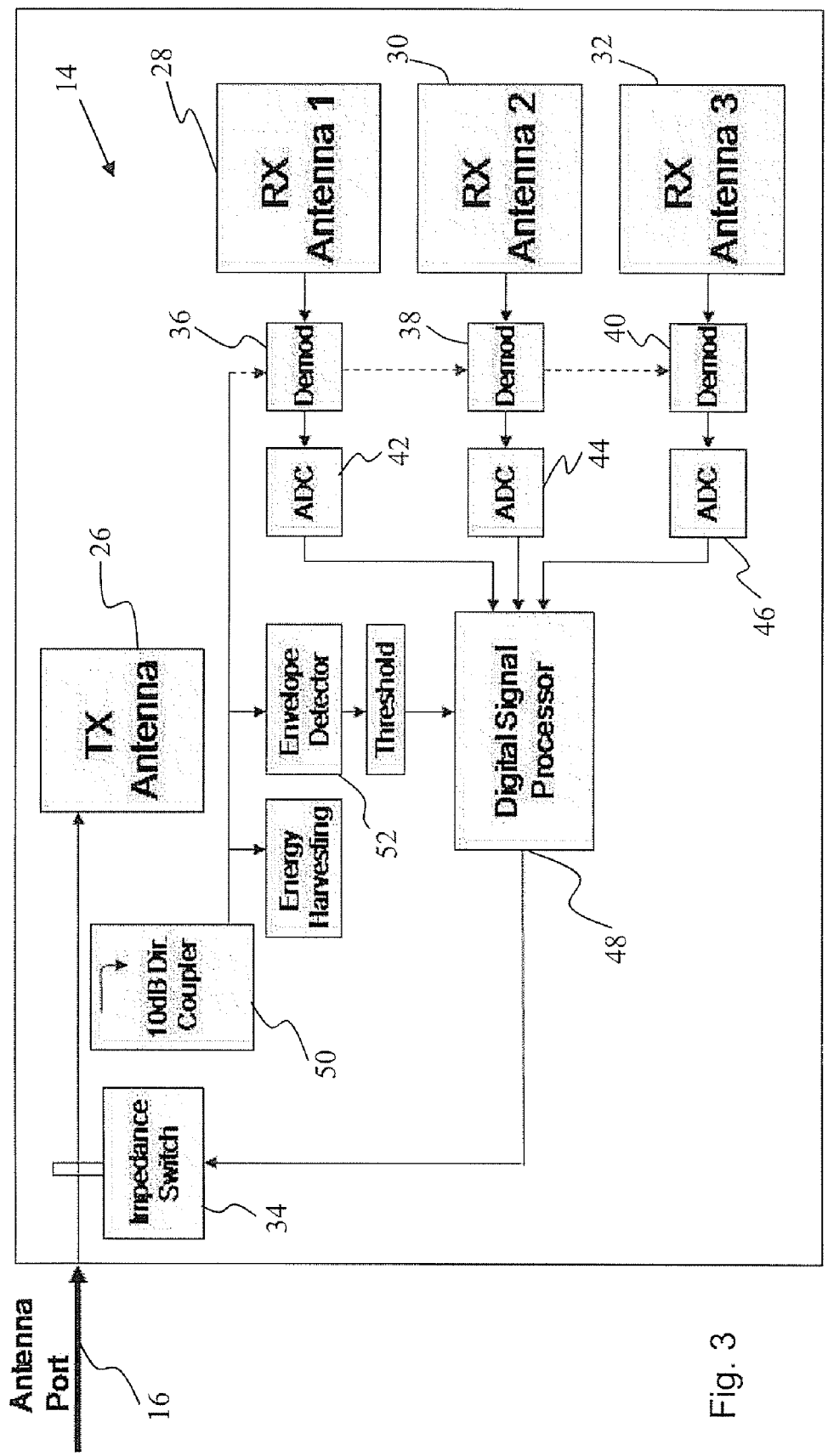
FIG. 3 depicts an architecture of an exemplary smart antenna appliqué.

Referring to FIGS. 1-3, we now describe an embodiment in which an RFID system 10 includes a conventional reader 12 coupled to an appliqué 14 for employing modulated backscatter using one of the reader's antenna ports 16,18. Two such configurations are depicted in FIGS. 1 and 2. FIG. 3 shows an exemplary architecture for the smart antenna appliqué 14 connected to the reader's antenna port 16.

As can be seen in FIGS. 1 and 2, the appliqué 14 is connected to a first antenna port 16 of the reader 12. In the case of a monostatic reader as depicted in FIG. 1, there is only one port 16 which acts as a transmitter and receiver bidirectional conduit simultaneously. While not being limited to a particular theory, the appliqué 14 is preferably connected to this first port 16 in the monostatic case by coaxial cable 20, although a person skilled in the art would recognize that alternative connectors are available, albeit wired or wireless.

FIG. 3 depicts an exemplary architectural schematic of the appliqué 14 coupled to the antenna port 16. The appliqué 14 also operates as a conventional RFID transmit and receive antenna, as far as the reader 12 is concerned. In particular, the reader 12 sends RF signals to the antenna port 16 in accordance with existing standard protocols, such as the Gen 2 UHF RFID protocol. The backscattered return signals from tags couple back into the reader 12 via the antenna port 16 through the appliqué 14, so that the reader can process these signals in the usual fashion.

The appliqué 14 depicted in FIG. 3 includes a smart antenna having a transmit antenna 26 and a plurality, for example three, receive antennas 28, 30 and 32, in communication with the antenna port 16 via an impedance switch 34. The receive antennas 28, 30 and 32 are each connected to respective demodulators 36, 38, and 40, which demodulate receive signals from the receive antennas. The demodulators 36, 38 and 40 are each connected to respective analog to digital (a/d) converters 42, 44, and 46, which sample the demodulated signals from the demodulators into digital form. The a/d converters 42, 44, and 46 are coupled to a Digital Signal Processor (DSP) 48, which processes the sampled signals for determining tag location as described in greater detail below. It is understood that the demodulators and a/d converters are shown separately in a quantity matching the number of receive antennas, and that the demodulators and converters may be formed integrally as combined units within the scope of the invention.

While the reader 12 waits for the tag response, it sends a continuous sine wave. The appliqué 14 includes a directional coupler 50 connected to the demodulators 38, 38, and 40. The directional coupler 50 captures a portion of the sine wave energy from the reader 12, and directs the portion to the demodulators that are connected to the receive antennas 28, 30, and 32 contained in the appliqué 14.

The appliqué 14 preferably includes 2 or more receive antennas. As the backscatter from a tag arrives at each of the receive antennas 28, 30, 32, of the appliqué, they are demodulated, sampled and fed into the Digital Signal Processor (DSP) 48. While not being limited to a particular theory, the DSP 48 preferably calculates the angle of arrival, based on the timing, and if desired the signal strength, of the signals received, as well as other parameters from the backscatter. This information can be stored in local memory (not shown) within RFID system 10, or more particularly, within the appliqué 14.

In a preferred embodiment, a reader 12 wanting to access this information sends a special RF signal that tags will not respond to (for example, it may address a tag with a non-existent ID), with the data field containing the ID of the tag whose location estimate is required. The appliqué 14 includes an envelope detector 52 which is connected to the output of the directional coupler 50. The envelope detector 52 demodulates the backscatter, which is then sampled and fed into the digital signal processor 48. The DSP 48 then decodes the message that the reader 12 is sending to the tag. When the DSP 48 sees that the reader is requesting to read the specific non-existent tag ID corresponding to the locationing request, and reads the data encoded by the reader to determine the ID of the tag for which the location is requested, the DSP simulates a tag backscatter by turning on and off a variable impedance via the impedance switch 34 that is connected either in series or parallel with the antenna input transmission line. The data encoded in this simulated backscatter field contains the tag ID, the location estimate for the tag, and a timestamp specifying when the location reading is taken.

As the reader 12 sends the sine wave, the modulating of impedance affects and varies the amounts of reflected energy going back into the reader antenna port 16. This also adds a small modulation on the transmitted sine wave, since the output power that gets through to the transmitter output will vary. For the monostatic reader illustrated in FIG. 1, the reflected power is modulated, making it look like a backscatter signal.

Referring to FIG. 2, the smart antenna appliqué 14 can be connected to an antenna port 16 of the reader 12, while conventional antennas 22 can be connected to other antenna ports 18 via coax cable 24 or another wire/wireless connector. The reader 12 can use the conventional antenna 22 to read tags as usual. The smart antenna appliqué 14, which is equipped with a receive antenna array of antennas 28, 30, 32, can calculate a location estimate, including, but not limited to, angles of arrival, for the tag based on the return signal from the tag. As an example, when the reader wishes to determine the location of a tag, it will attempt to read a specific (invalid) memory location for the tag by transmitting an RF signal on the antenna port 16 connected to the smart antenna appliqué 14. Alternatively, the reader 12 can use a specific invalid tag ID, specifying in the data field the true ID for the tag whose location is to be determined. This RF signal is not transmitted on air by the appliqué 14. Rather, the appliqué receives this signal, looks up its location estimate for the tag in question, and then simulates a tag's modulated backscatter signal, with the location data inserted into the modulation. This simulated backscattered RF signal is sent back to the reader 12 via the coaxial cable 20 connected to antenna port 16. The reader demodulates this signal in standard fashion and reads off the location data.

Still referring to FIG. 2, the reader 12 will typically request location data for a tag that it has already read using the conventional antenna 22, in which case the appliqué 14 will already have a location estimate for the tag available based on the backscattered signal from the tag on the prior read. The location data can contain both a location estimate and a timestamp for when the location estimate was obtained, which enables tracking of tagged assets whose position changes as a function of time. If the reader 12 requests location data for a tag that has not yet been read, the appliqué 14 may return a default value for the location data that indicates that a location estimate is not available. From the reader's point of view, the appliqué 14 plays the role of an antenna that it employs whenever it requires location information regarding a tag. In this scenario, the transmit antenna 26 shown in FIG. 3 is not required, since the appliqué's main functionality is to receive backscattered signals, determine location estimates, and to generate simulated backscatter signals to feed back into the reader antenna port 16.

The addition of localization functionality to the reader 12 provided by the appliqué 14 under either of the exemplary configurations shown in FIGS. 1 and 2 is achieved by a software or firmware upgrade, and does not require hardware changes in the reader. As shown in FIG. 3, the appliqué 14 can also harvest energy from the signal provided by the reader 12, which eliminates the need for a separate power source for powering the appliqué.

Figure 4:
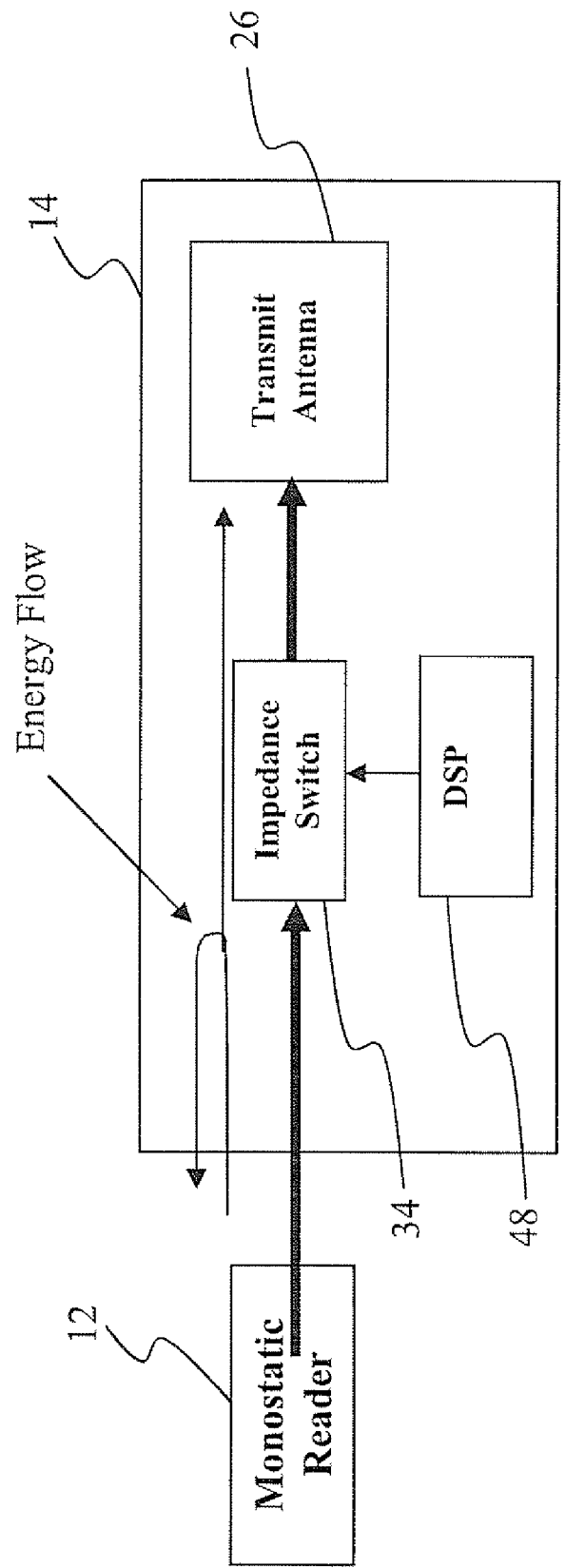
FIG. 4 shows energy flow for a simulated backscatter of the exemplary embodiment of FIG. 1.

FIG. 4 illustrates how this simulated backscatter is generated and received in the monostatic and bistatic cases discussed above. In the case of a bistatic reader, the receive antenna 22 connected to the receive port 18 of the reader 12 will pick up the simulated backscatter that was output from the transmit antenna 26 of the appliqué 14. The extent of upgrade to a conventional reader in order to accommodate an appliqué as described above varies with the specific method used to realize the request for tag location data, and for generation of simulated backscatter with the tag location data. Of course, for a monostatic reader configuration, the appliqué 14 implements both transmit and receive functions. Thus the receive antennas 28, 30, 32 will pick up the simulated backscatter output from the transmit antenna 26.

If the appliqué 14 implements both transmit and receive functionalities, then the reader 12 sends a special RF signal to the appliqué that specifies the ID of the tag whose location data is required. This RF signal is also transmitted on air, and should therefore be designed such that (a) it is a signal that a conventional reader is capable of generating, and (b) it is ignored by the tags, so that there is no backscatter except for the simulated backscatter generated by the appliqué. For any given protocol, one skilled in the art can easily devise such signals. Some examples are given for the Class 1 Gen 2 (C1G2) protocol for UHF tags. Of course it is understood that the scope of the disclosed methods is not limited to these examples.

By example, when the application-layer software wants location information, it singulates a specific tag ID, or EPC code, assigned to the appliqué 14 (chosen so that tags deployed in the field would not have this ID). Then the reader 12 puts the appliqué product in the equivalent of the C1G2 tag "open" state at which time the reader could issue a "read" command. The address of the memory location being read is preferably the EPC of the real tag to get location information for. The appliqué would then backscatter location data as if it were the contents of a tag's memory bank. The appliqué in this case plays the role of a tag whose memory contains the location information obtained for the actual tags that the reader has read. In another example of the preferred embodiments, the appliqué product can act like a tag in the field, contending for communication with the reader with other tags when it generates its backscatter signal, but the tag ID and memory data is chosen such that higher-layer software in the reader can recognize that these reads correspond to a simulated tag providing location data for actual tags. Both of these solutions have the advantage of not requiring firmware modifications to a reader. They only require application layer changes to the software driving the reader. In the first case, the higher layer software in the reader can "pull" location data from the appliqué 14 by making requests to read a specific tag ID assigned to the appliqué. In the second case, the appliqué can "push" location data up to higher layer software in the reader 12.

If a reader 12 sends a read command with a bad handle (the handle refers to a specific random number generated by the tag and sent back to the reader in earlier communication) to a tag in the open state, the tag ignores the command and backscatters nothing. The appliqué 14 generates the simulated backscatter signal with the tag's location data if it sees a particular handle in a read command that is the wrong one. This is preferably implemented by firmware modifications to the reader.

An appliqué 14 can also be attached to a reader 12 through the reader's Ethernet port. The appliqué can then receive information from the reader (e.g., tag identity and data), add information that it has gathered (e.g., location estimate), and send it on via its own network link. Alternatively, information gathered by the appliqué 14 could be routed through the reader 12 and sent out via the reader's network link. An advantage of such a configuration is that existing arrangements for powering the reader could be used to power the appliqué (e.g., power could be provided to the appliqué by the reader over the Ethernet connection). This arrangement also requires only software or firmware upgrades to the reader as readily understood by a skilled artisan.

Figure 5:
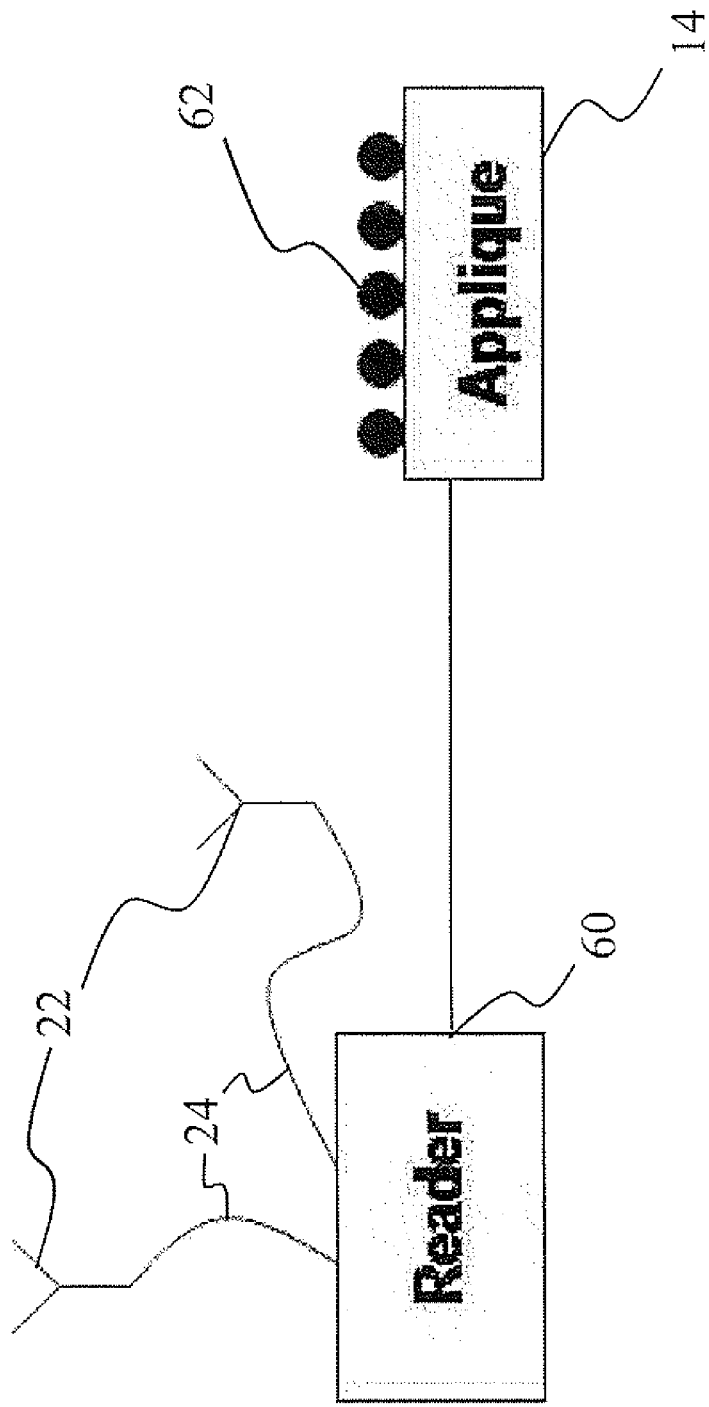
FIG. 5 is a schematic of an exemplary smart antenna appliqué connected to a reader's Ethernet port.

FIG. 5 depicts an exemplary deployment in which an appliqué 14 is connected to a conventional reader's Ethernet port 60. The appliqué 14 could also be connected to the reader 12 via other interfaces (e.g., through an antenna port, as described earlier). The appliqué 14 preferably has a receive beamforming array 62 that enables it to localize the tags that are responding to the reader 12 in communication with the appliqué 14. The appliqué could also receive and process signals from tags that are responding to other readers 12. Information obtained from multiple appliquéscan be integrated in middleware, or by explicitly sharing information across appliqués 14 and readers 12 via a communication network separate from the RFID communication between readers and tags as readily understood by a skilled artisan. The appliqué 14 can route the information it acquires through the reader 12, and the reader could route the information it acquires through the appliqué.

While not being limited to a particular theory, the reader 12 and the appliqué 14 are adapted for network connectivity through either wireless or wireline systems. The appliqué preferably employs a receive antenna array 62 (FIG. 5) to obtain location estimates for tags based on the signals it receives from them. The appliqué uses its connection to the reader to better implement its signal processing functionalities. For example, the appliqué 14 can obtain an accurate replica of the RF carrier signals used by the reader's transceiver. In one example, the appliqué taps the RF signal emitted by the reader through a wired connection. The reader 12 preferably uses a lower frequency signal (e.g., from a crystal oscillator) to derive its RF carrier using a phase locked loop (PLL). Thus, in this example, the appliqué can tap this lower frequency signal through a wire, and derive an RF carrier using its own PLL. The RF carrier reference thus acquired can be used for standard demodulation purposes, as well as for more sophisticated functionalities such as interference cancellation of the reader's transmitted signal in order to increase the reliability of processing the weaker signals received from the tags.

A specific problem solved using appliqué 14 is that of eliminating unwanted reads in passive RFID systems. In a dense reader environment, a reader might be designated to read tags in a particular area (for example, all tags passing under a given dock door), but it might end up occasionally reading tags from another location. This problem is exacerbated by channel fades in a rich multipath environment, which may cause spatial fluctuations relative to the expected signal strength of tens of decibels: a distant reader may occasionally see a better channel than the intended reader. In this setting, the appliqué 14, which is capable of localization can resolve the ambiguities in tag location resulting from an unintentional read.

Figure 6:
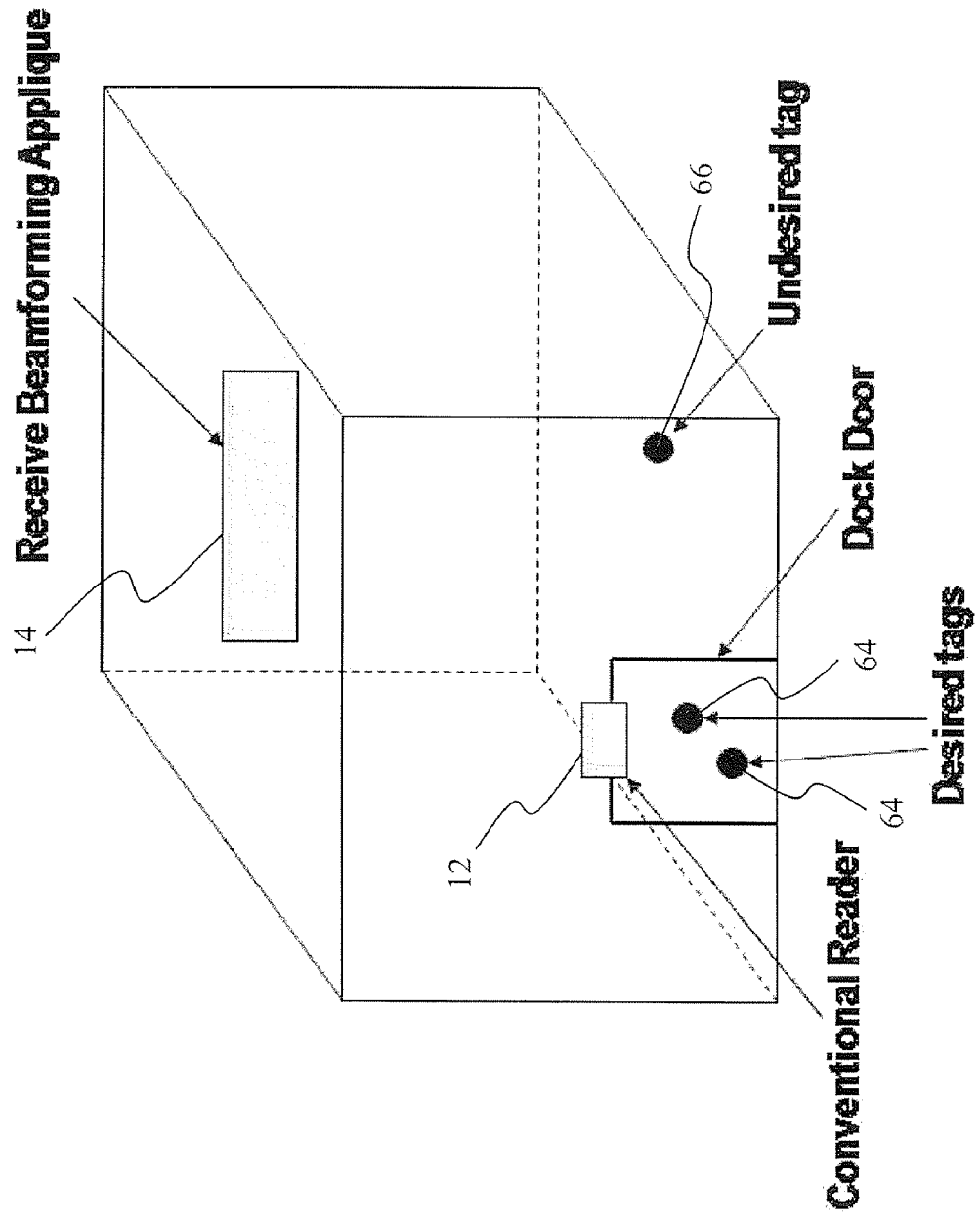
FIG. 6 shows an exemplary deployment in which a receive beamforming appliqué is used to eliminate undesired reads.

FIG. 6 depicts an example deployment of the preferred embodiments in which a receive beamforming appliqué 14 is used to eliminate undesired reads. A conventional reader 12, which is supposed to read tags 64 passing under a dock door can occasionally read undesired tags 66 in other locations, as shown in the figure. Placement of the receive beamforming appliqué 14 can eliminate this ambiguity by estimating the angle of arrival from the tag's response, as discussed for example above.

Figure 7:
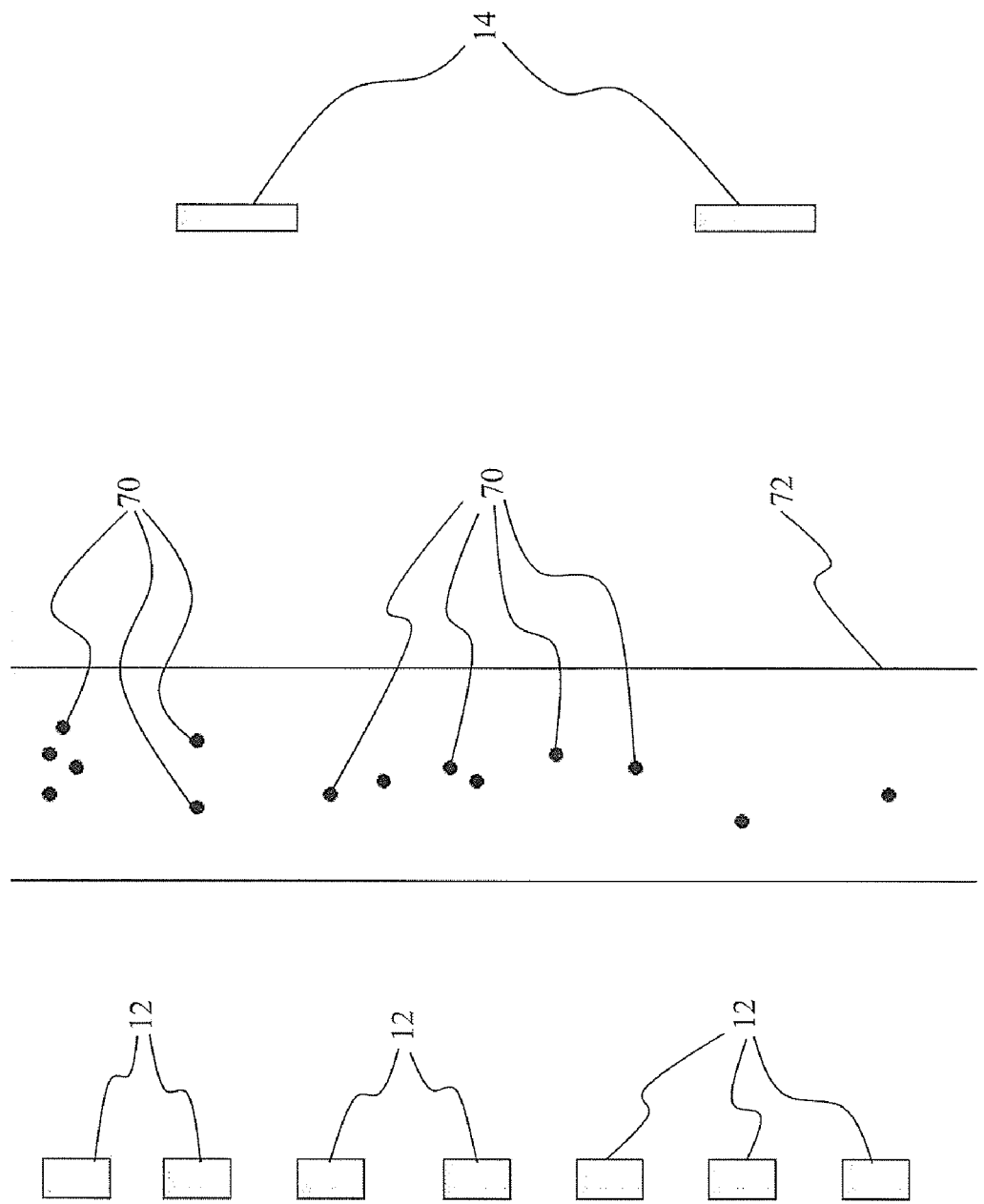
FIG. 7 shows another exemplary deployment in which a large number of readers are placed to read tagged items.

FIG. 7 depicts another example deployment of the preferred embodiments in which a large number of conventional readers 12 (e.g., greater than three) are placed close to each other to read tagged items 70 as they pass along a conveyor belt 72. The purpose of the closely placed readers 12 is to associate each tag with its location, based on the reader 12 with which it establishes communication. However, undesired reads can be a significant source of error in this scenario. As can be seen in FIG. 7, a sparse deployment of receive beamforming appliqués 14 significantly reduces this uncertainty in tag localization by estimating the angles of arrivals of the signals emitted by the tags.

As noted above, the appliqués 14 can have network connectivity via a wireless or wireline network, but they are designed so as to not affect the standard communication between RFID readers 12 and tags. Rather, they extract additional information by listening to communications between tags and readers. For systems with passive tags, appliqués 14 are especially effective in listening to uplink communication from tag to reader 12, which has a significantly longer range than downlink communication from reader to tag. In this case, while the placement of readers 12 is governed by the downlink bottleneck, a much smaller number of appliqués can be used to monitor the longer-range uplink communication. In addition to increased reliability, appliqués 14 provide localization information using a variety of techniques, including angle of arrival, time of flight, and received signal strength.

Appliqués 14 are also useful for a backwards compatible upgrade of reader functionality for a single reader 12. For example, as the range of RFID communication increases (active tags have ranges of the order of 100 meters, semi-passive tags have ranges of 10 s of meters, and passive tags can have a range of up to 10 m), the problem of tag localization becomes increasingly important. An appliqué 14 designed to use information such as angle of arrival, received signal strength, or time of flight from the uplink received signal can provide such functionality.

Appliqués 14 can also be placed independently of the readers 12. The information gathered by readers and appliqués could either be integrated at the readers, at the appliqués, or could be sent independently through the network, to be processed using middleware as readily understood by a skilled artisan.

Figure 8:
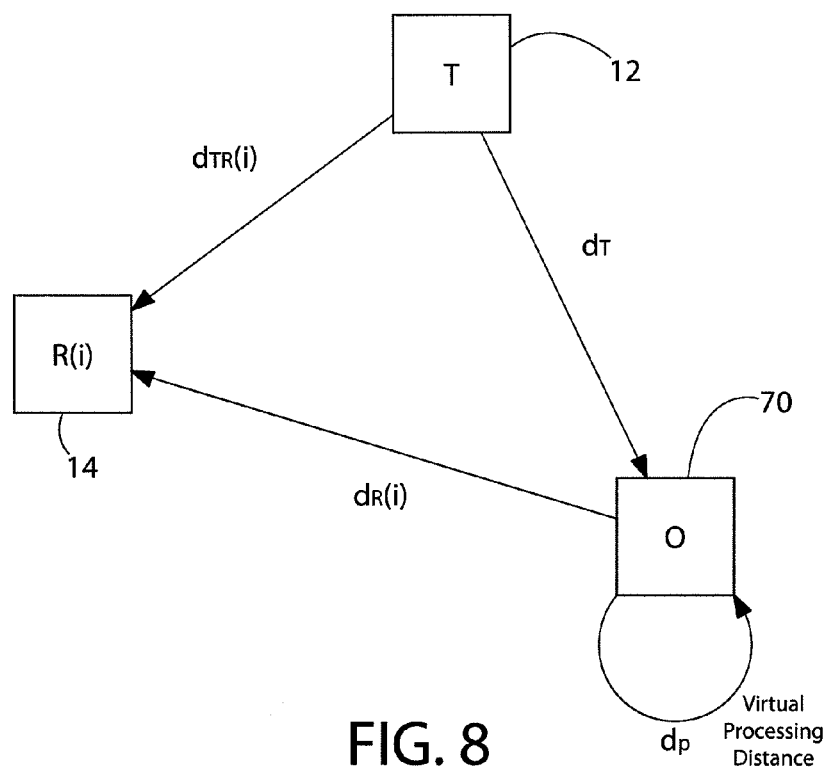
FIG. 8 illustrates an exemplary geometry for a time of flight based localization scheme in accordance with the preferred embodiments.

In addition to location estimates obtained using receive antenna arrays 28, 30, 32, 62, appliqués 14 equipped with single antennas can provide location estimates based on received signal strength and time of flight. A specific form of localization that is of interest is borrowed from ideas of multistatic radar, in which one or more receivers, placed at a different location from the radar transmitter, listen for the reflection of the transmitted signal. However, unlike conventional multistatic radar, where the target is passive, in the localization application considered here, the target is a cooperative RFID tag. For RFID-based localization, a transmitter T, which may be a conventional reader 12, broadcasts a query for the tag to be located. As shown in FIG. 8, appliqué receivers R(1), R(2), . . . , R(n) hear both the query sent by the transmitter and the response from the tag, if any.

Continuing with FIG. 8, for appliqué 14 receiver R(i), the time between hearing the query and the response is denoted by t(i), and the corresponding distance estimate is denoted by d(i)=ct(i), where c denotes the speed of light. For ideal line of sight (LOS) communication, the time t(i) equals the time of flight from the transmitter T of the reader 12 to the tagged item 70 (also referred to as "tagged object O"), plus the time from the tagged object O to the receiver R(i), plus the processing delay $t_p$ at the tagged object O. Let $d_p=ct_p$ equal the nuisance parameter corresponding to the virtual distance associated with the processing delay. Then we have the following equation relating the distances defined above for $1 \leq i \leq n$: $d_T + d_p + d_R(i) - d_{TR}(i) = d(i) + N(i)$ where $d_T$ is the distance from the transmitter T to the tagged object O, $d_R(i)$ is the distance from the receiver R(i) to the tagged object O, $d_p$ is the virtual distance associated with the processing delay at the tag, $d_{TR}(i)$ is the distance from the transmitter T to the receiver R(i), and N(i) is measurement noise.

For transmitter and receivers 12 in known locations, the distances $d_{TR}(i)$ are known. A brute force algorithm for estimating the location of the tagged object provides the best least squares fit between the measurement d(i) and the left-hand side corresponding to a specific hypothesized location and a hypothesized value of the virtual distance. While not being limited to a particular theory, a sufficient number of equations for solving for the three dimensional coordinates of the tagged object O and the virtual processing distance are obtained if there are four or more receivers 12 (one receiver can be the transmitter itself). However, there are more sophisticated methods for more efficiently estimating the target's location based on easy modifications of the state of the art regarding localization algorithms. A key aspect of the disclosed scheme is the use of the signal transmitted by transmitter T for implicitly synchronizing the receivers, thus avoiding the need for prior fine-grained timing synchronization across the network. Another key aspect is the use of the principle of multistatic radar in the context of RFID-based localization.

Appliqués 14 providing location information are applicable to RFID systems with passive tags, semi-passive tags, active tags, and to combinations thereof. The term tag is broadly applicable to any device that enables identification and/or location of an asset, whether or not the device was originally intended for this purpose. For example, a laptop with WiFi capability may be viewed as a tagged asset, since one or more appliqués listening to communications from this laptop can estimate the location and ID (e.g., via the MAC or IP address) of the laptop. A network of appliqués with multiple receive antennas, for example, can estimate the locations of WiFi-enabled devices and tags by listening to ongoing communication. The information gathered by appliqués using received antenna arrays 62 can be integrated with information obtained by other devices using received signal strength or time of flight. Bayesian techniques for integrating location information from a variety of sources, obtained using a variety of techniques, as well as methods of tracking asset movement, such as particle filters or Kalman filters, can be used to provide a comprehensive infrastructure for asset location and movement in an environment of interest. Again, the appliqués can be networked with each other, and with other devices, using wired or wireless communication.

It is understood that the appliqué in communication with an RFID reader and communication methods thereof described and shown are exemplary indications of preferred embodiments of the invention, and are given by way of illustration only. In other words, the concept of the present invention may be readily applied to a variety of preferred embodiments, including those disclosed herein. While the invention has been described in detail and with reference to specific examples thereof, it will be apparent to one skilled in the art that various changes and modifications can be made therein without departing from the spirit and scope thereof. Without further elaboration, the foregoing will so fully illustrate the invention that others may, by applying current or future knowledge; readily adapt the same for use under various conditions of service.

What is claimed is:

1. An appliqué for use in an RFID system, said appliqué comprising a smart antenna having a transmit antenna and a plurality of receive antennas in communication with an antenna port of a RFID reader, the smart antenna including a plurality of matching demodulators, each matching demodulator attached to one of the receive antennas to demodulate a RF signal received by the attached receive antenna from an RFID tag, a plurality of matching a/d converters, each matching a/d converter attached to one of the matching demodulators and converting the demodulated RF signals to digital sample signals, and a digital signal processor for calculating an angle of arrival of the RF signal and locating the position of the RFID tag based on the digital sample signals, for conveying to said RFID reader.

2. The appliqué as recited in claim 1, further comprising a directional coupler connected to the matching demodulators, the directional coupler capturing sine wave energy from the RFID reader and directing the energy to the matching demodulators.

3. The appliqué as recited in claim 2, further comprising an envelope detector connected to the directional coupler and to the matching demodulators for demodulating a signal from the reader.

4. A method for locating the position of an RFID tag, comprising:
    (a) receiving a backscatter signal from the RFID tag by a plurality of antennas of an appliqué in communication with an antenna port of a RFID reader;
    (b) demodulating the received backscatter signal;
    (c) converting the demodulated backscatter signal into digital sample signals;
    (d) reading the digital sample signals;
    (e) calculating an angle of arrival of the backscatter signal received by the appliqué based on the digital sample signals; and
    (f) conveying said calculated angle of arrival to said RFID reader.

5. The method of claim 4, further comprising reading a backscatter signal from the RFID tag by a RFID reader, the reading of the backscatter signal by the RFID reader being in addition to the reading of the digital sample signals of step (d).

6. The method of claim 4, further comprising transmitting an RF signal from the RFID reader of a location request and wherein said RFID tag does not respond to the RF signal, reading the RF signal by the appliqué, simulating a backscatter response with an identification and location estimate of the RFID tag at the appliqué, and reading the simulated backscatter response at the RFID reader.

* * * * *

UNITED STATES PATENT AND TRADEMARK OFFICE
CERTIFICATE OF CORRECTION

PATENT NO. : 8,217,760 B2
APPLICATION NO. : 12/407383
DATED : July 10, 2012
INVENTOR(S) : Wild et al.

It is certified that error appears in the above-identified patent and that said Letters Patent is hereby corrected as shown below:

In the Specification, col. 4, line 24, the phrase "connected to the demodulators 38, 38, and 40" should read "connected to the demodulators "36, 38, and 40".

In the Specification, col. 7, line 3, the phrase "Information obtained from multiple appliquéscan . . ." should read "Information obtained from multiple appliqués can . . .".

Signed and Sealed this
Seventeenth Day of September, 2013

Teresa Stanek Rea
*Deputy Director of the United States Patent and Trademark Office*